(12) United States Patent
Buck et al.

(10) Patent No.: US 10,996,327 B2
(45) Date of Patent: May 4, 2021

(54) SYSTEM AND METHOD FOR ACOUSTIC DETECTION OF EMERGENCY SIRENS

(71) Applicant: Cerence Operating Company, Burlington, MA (US)

(72) Inventors: Markus Buck, Biberach (DE); Julien Premont, Neu-Ulm (DE); Friedrich Faubel, Ulm (DE)

(73) Assignee: Cerence Operating Company, Burlington, MA (US)

( * ) Notice: Subject to any disclaimer, the term of this patent is extended or adjusted under 35 U.S.C. 154(b) by 130 days.

(21) Appl. No.: 16/516,786

(22) Filed: Jul. 19, 2019

(65) Prior Publication Data

US 2020/0025904 A1    Jan. 23, 2020

Related U.S. Application Data

(60) Provisional application No. 62/701,169, filed on Jul. 20, 2018.

(51) Int. Cl.

| | |
|---|---|
| *G01S 13/58* | (2006.01) |
| *G08G 1/0965* | (2006.01) |
| *H04R 1/40* | (2006.01) |
| *B60W 30/08* | (2012.01) |
| *G05D 1/02* | (2020.01) |

(52) U.S. Cl.
CPC .......... *G01S 13/584* (2013.01); *B60W 30/08* (2013.01); *G05D 1/0214* (2013.01); *G08G 1/0965* (2013.01); *H04R 1/406* (2013.01); *B60W 2420/54* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 8,094,040 B1* | 1/2012 | Cornett | G08G 1/087 340/902 |
| 2009/0179774 A1* | 7/2009 | Mohan | G08G 1/0962 340/902 |
| 2015/0304784 A1* | 10/2015 | Snider | G08G 1/0965 381/56 |
| 2016/0070788 A1* | 3/2016 | Vrazic | G06F 16/683 707/769 |
| 2017/0180863 A1* | 6/2017 | Biggs | H04R 1/1075 |
| 2019/0139565 A1* | 5/2019 | Chang | G08B 13/19636 |

FOREIGN PATENT DOCUMENTS

WO    2018050913 A1    3/2018

\* cited by examiner

*Primary Examiner* — Jonathan M Dager
*Assistant Examiner* — Garrett F Evans
(74) *Attorney, Agent, or Firm* — Occhiuti & Rohlicek LLP

(57) ABSTRACT

A system and method for detecting multi-tone sirens despite environmental noises that may be present obtains a microphone input signal, applies, in real time, a time-frequency analysis to the microphone input signal to determine a time-frequency representation, provides at least one multi-tone model that has a plurality of tone duration patterns, performs multi-tone siren detection on the time-frequency representation, the detection based on the at least one multi-tone model and factoring of doppler shifts, and generates a detection result that can be used in systems for automated vehicles.

15 Claims, 5 Drawing Sheets

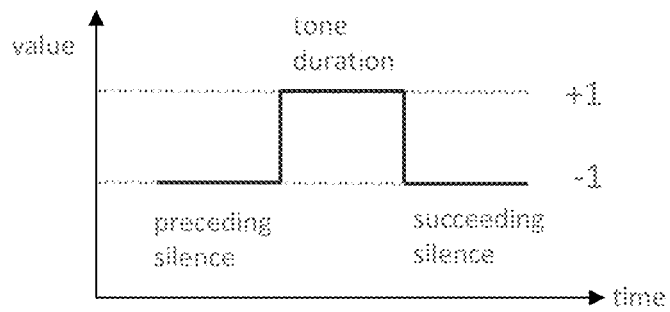

FIG. 6

Upper tone (e.g. 640 Hz) 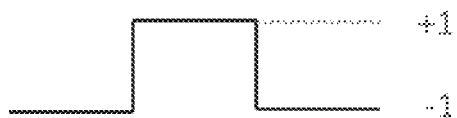

Lower tone (e.g. 470 Hz) 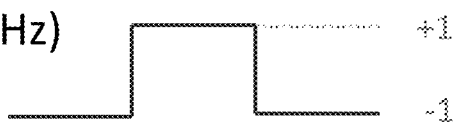

810
Acquire integral signal representation in time direction over spectral magnitude values or other values that are calculated based on the spectrogram.

820
For each frequency / duration pattern and for each time stretching factor corresponding to a relevant Doppler shift, calculate the cross-correlation of the tone duration pattern using the integral image representation.

830
Determine presence of duration pattern by post-processing the result of the cross-correlation.

FIG. 8

SYSTEM AND METHOD FOR ACOUSTIC DETECTION OF EMERGENCY SIRENS

CROSS-REFERENCE TO RELATED APPLICATIONS

This application claims the benefit of U.S. Provisional Application No. 62/701,169, filed Jul. 20, 2018.

BACKGROUND

1. Field of the Disclosure

The present disclosure is directed to a system and method for detecting multi-tone sirens, and particularly for detecting multi-tone sirens despite environmental noises that may be present.

2. Description of Related Art

Automated vehicles that are capable of sensing their environment and operating with little to no human effort are being rapidly developed and deployed. Automated vehicles include autonomous vehicles, semi-autonomous vehicles and vehicles with automated safety systems. These vehicles provide full or partly automated control features that keep the vehicle within its lane, perform a lane change, regulate speed and engage the vehicle brakes, for example.

A well-known classification system is promulgated by The Society of Automotive Engineers (SAE International) and classifies vehicles according to six increasing levels of vehicle automation, from "Level 0" to "Level 5". These levels feature, in increasing order, warning systems but no automation, driver assistance, partial automation, conditional automation, high automation and full automation. Level 0 vehicles have automated warning systems, but the driver has full control. Level 5 vehicles require no human intervention. The term "automated vehicle" as used herein includes Level 0 to Level 5 autonomous and semi-autonomous vehicles.

In most cities and countries, laws require that vehicles pull over and yield to approaching emergency vehicles. Emergency vehicles utilize multi-tone sirens that cycle through a sequence of tones having a predefined duration. Recognition of approaching emergency vehicles is critical to public safety in general and especially in systems for automated vehicles.

Present siren detection methods lack robustness in real world operating conditions because of environmental noise. As used herein, environmental noises include sounds produced by vehicles and vehicular traffic, speech, music, and the like.

SUMMARY

The present disclosure provides a system and method for detecting a multitone siren by accounting for a doppler shift attributable to a relative speed between an emergency vehicle and an automated vehicle.

The present disclosure provides such a system and method that uses an explicit model of the multi-tone siren signal, which model describes the siren as a sequence of tones that are specified by their fundamental frequency and duration.

The present disclosure further provides such a system and method that factors and/or models the change of the tones' fundamental frequencies and durations due to the doppler shift.

The present disclosure still further provides such a system and method that uses integral signal representations to efficiently detect tone duration patterns.

The present disclosure still further provides such a system and method that considers the effect on upper harmonics.

The present disclosure still yet further provides such a system and method that detects tones over their entire duration period so that unwanted perturbation by interfering tonal signals such as speech and music is minimized.

The system and method of the present disclosure can advantageously detect the siren signals at very low signal-to-noise ratios (SNR) and notwithstanding whether the siren signal is overlaid by tonal signals, such as speech or music.

BRIEF DESCRIPTION OF THE FIGURES

The accompanying drawings illustrate aspects of the present disclosure, and together with the general description given above and the detailed description given below, explain the principles of the present disclosure. As shown throughout the drawings, like reference numerals designate like or corresponding parts.

FIG. 6 shows an example duration pattern for a single tone pattern.

FIG. 7 shows an example duration pattern for a two-tone pattern.

FIG. 8 is a logic diagram of an example algorithm for the detection of siren segments.

DETAILED DESCRIPTION

Figure 1:
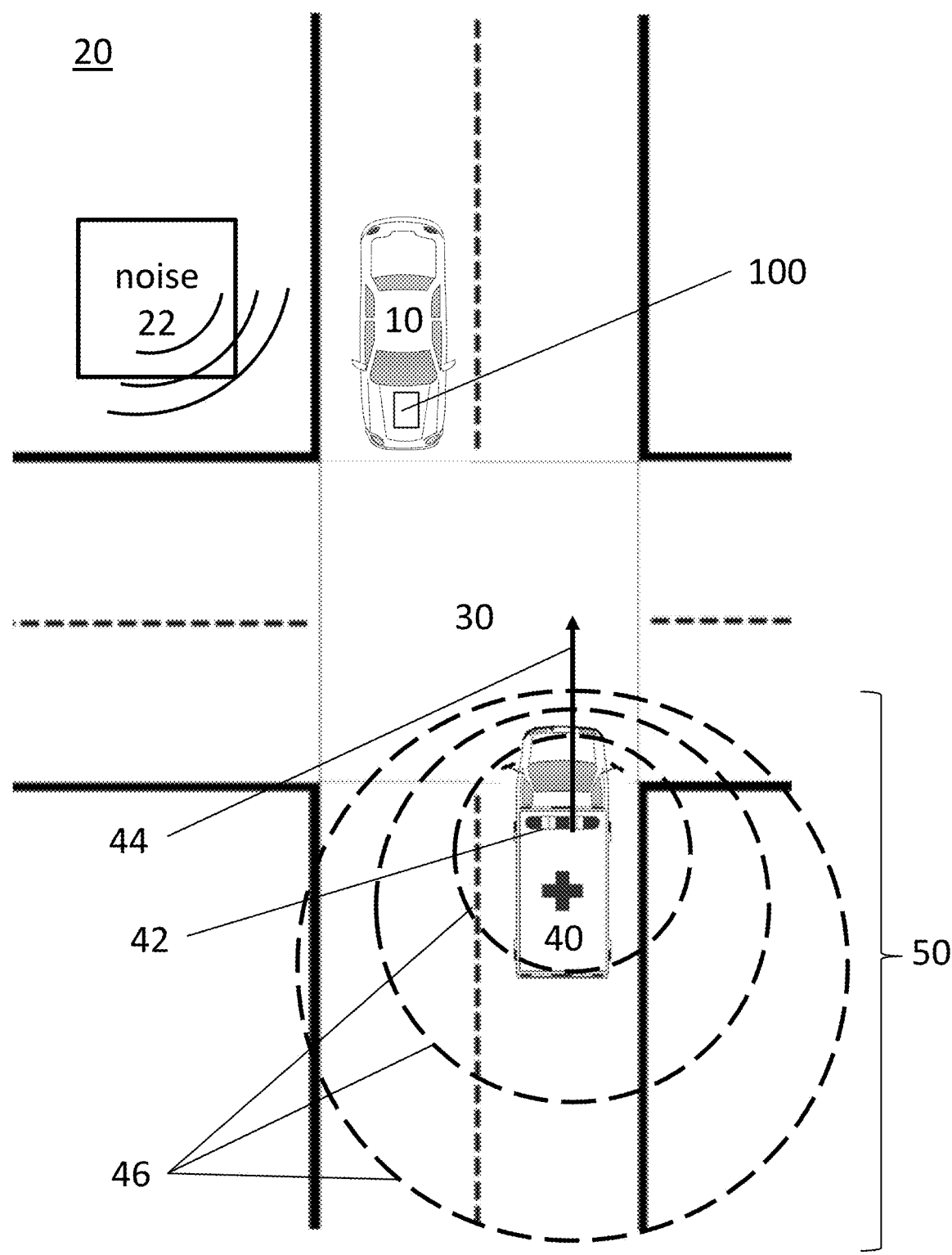
FIG. 1 shows an exemplary environment for the system and method of the present disclosure.
Figure 2:
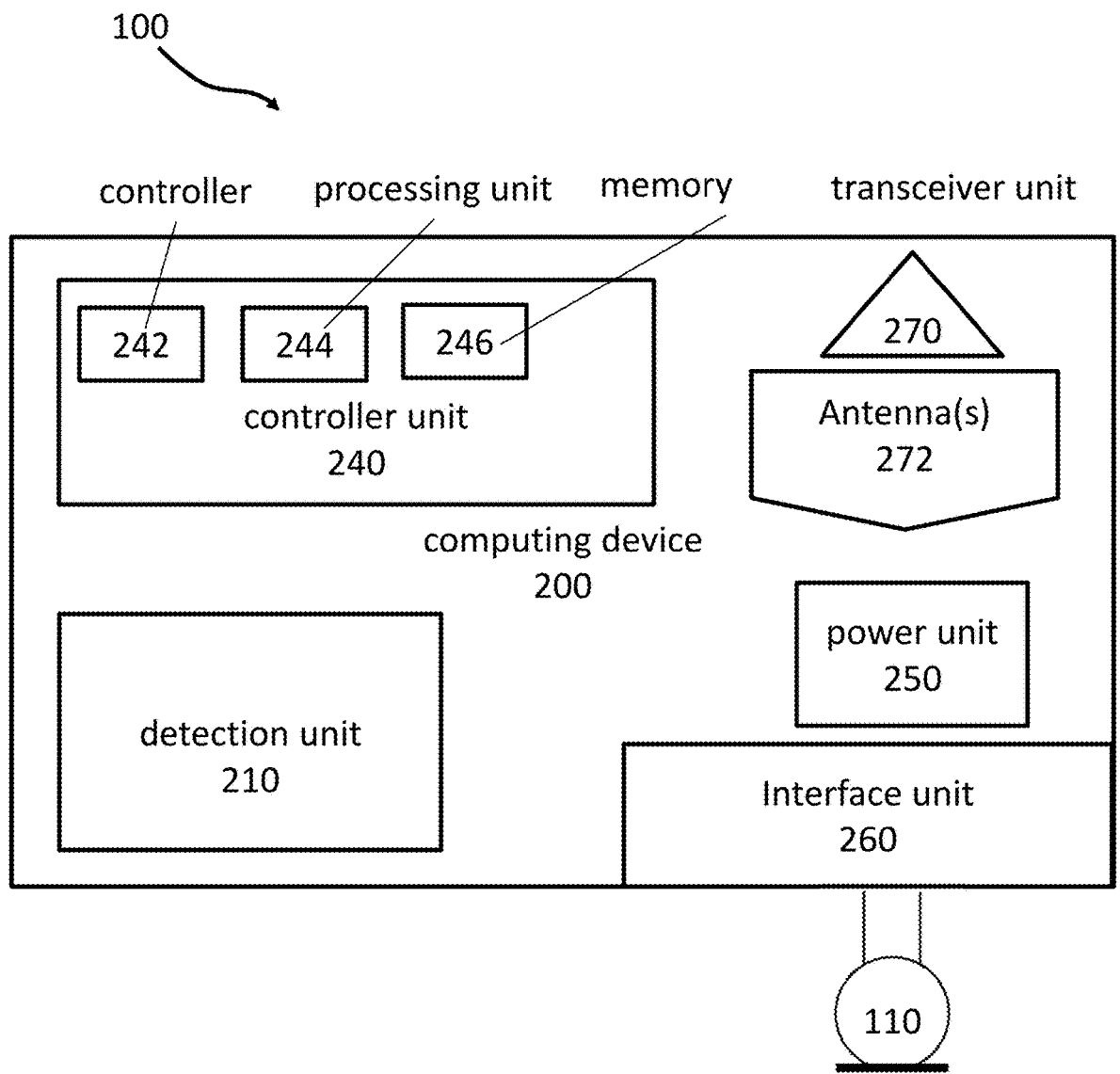
FIG. 2 shows an exemplary embodiment of the system according to the present disclosure.

Referring to the drawings and, in particular to FIGS. 1 and 2, a system for acoustic detection of emergency sirens is generally represented by reference numeral 100, hereinafter "system 100". As shown in FIG. 2, system 100 utilizes a microphone 110 and computing device 200 to acoustically detect an active emergency siren, e.g., siren 42, in an example environment 20 shown in FIG. 1.

Referring again to FIG. 1, an automated vehicle 10 having system 100 is shown operating in environment 20 on an example roadway system, e.g., roads 30. An emergency vehicle 40 having siren 42 is also operating on roads 30. Emergency vehicle 40 is traveling in a direction 44 as indicated by an arrow.

Siren 42 produces sound waves 46. In example embodiments, siren 42 is a multi-tone siren. As used herein, a "multi-tone siren" is a loud noise-making device that generates two or more alternating tones such as alternating "hi-lo" signals. Unless otherwise specified in this disclosure, a sound is a vibration that typically propagates as an audible wave of pressure, through a transmission medium. A tone is sound at one specific frequency.

Figure 3:
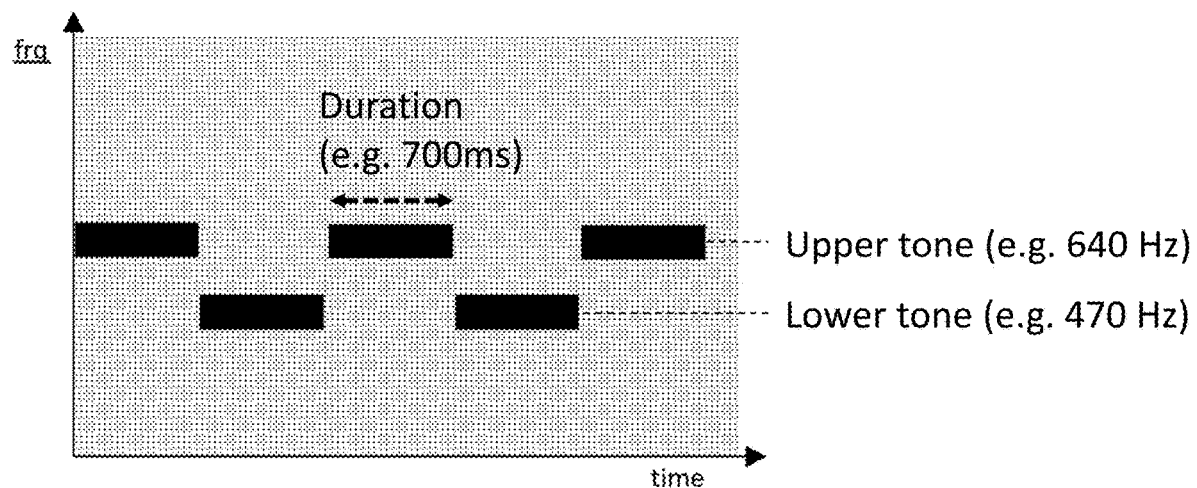
FIG. 3 shows a fundamental frequency of a multi-tone siren over time.

FIG. 3 shows an example fundamental frequency of a multi-tone siren, such as siren 42, over time. Siren 42 produces a repeating pattern or sequence of tones, which have different fundamental frequencies and durations. The grid indicates time/frequency bins.

Figure 4:
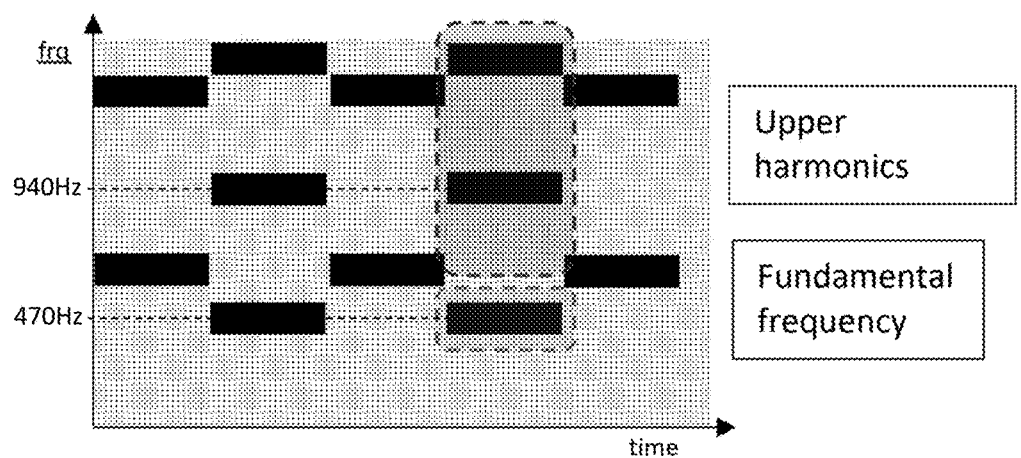
FIG. 4 show the fundamental frequency of FIG. 3 and upper harmonics at integer multiples of the fundamental frequency.

FIG. 4 shows an example fundamental frequency and upper harmonics at integer multiples of the fundamental frequency. The grid indicates time/frequency bins.

Although it can be seen that the time/frequency pattern of a siren signal is clearly defined, in real operating conditions there is significant variability.

Referring back to FIG. 1, an example of such variability is shown. Specifically, sound produced by siren 42 is affected by the doppler effect, which is generally referenced by numeral 50. The doppler effect is a change in frequency or wavelength of sound waves 46 in relation to automated vehicle 10 when there is relative movement between the automated vehicle and the source of the sound waves. In this example, emergency vehicle 40, and thus siren 42, is moving in direction 44. Stated another way, a doppler shift occurs because of the relative speed difference between automated vehicle 10 and approaching emergency vehicle 40 emitting sound from siren 42.

For example, if automated vehicle 10 drives at a velocity of $v_1=150$ km/h and emergency vehicle 40 drives at a velocity of $v_2=50$ km/h, there is a speed difference of $v_1-v_2=100$ km/h, which needs to be added to the speed of sound. Hence, the speed of sound changes from c=1235 km/h to $c+v_1-v_2=1335$ km/h, which corresponds to a factor of 1335/1235=1.081. This 8% increase in the speed of sound changes the duration of tones by a factor of 1/1.081=0.925 (time stretching factor) and it increases the frequency of tones by 8%, i.e. a 1000 Hz tone becomes a 1080 Hz tone, a 3000 Hz tone becomes a 3240 Hz tone, . . . etc.

In general, if automated vehicle 10 approaches emergency vehicle 40 with a relative speed $\Delta v$, the time stretching factor $\alpha$ is defined as:

$$\alpha = tsf(\Delta v) = \frac{c}{c + \Delta v}$$

where c denotes the speed of sound in km/h. The duration of all tones of the siren pattern needs to be multiplied by this value. The change in frequency due to the Doppler shift, by which change each tone frequency is to be multiplied, is:

$$\frac{1}{\alpha} = \frac{c + \Delta v}{c}$$

Note that $\Delta v$ becomes negative, if the automated vehicle 10 is driving away from emergency vehicle 40. The time stretching factor $\alpha$ will become bigger than 1 in this case and the siren tone frequencies will decrease, as $1/\alpha$ is smaller than 1.

Noises 22 also exist within environment 20. Noises 22 are environmental noises that include sounds produced by vehicles and vehicular traffic, speech, music, and the like. Noises 22 are generally dynamic with respect to one or more of pitch, intensity, and quality.

Referring to FIG. 2, example components of system 100 will now be discussed.

System 100 includes the following exemplary components that are electrically and/or communicatively connected: a microphone 110 and a computing device 200.

Microphone 110 is a transducer that converts sound into an electrical signal. Typically, a microphone utilizes a diaphragm that converts sound to mechanical motion that is in turn converted to an electrical signal. Several types of microphones exist that use different techniques to convert, for example, air pressure variations of a sound wave into an electrical signal. Nonlimiting examples include: dynamic microphones that use a coil of wire suspended in a magnetic field; condenser microphones that use a vibrating diaphragm as a capacitor plate; and piezoelectric microphones that use a crystal of made of piezoelectric material. A microphone according to the present disclosure can also include a radio transmitter and receiver for wireless applications.

Microphone 110 can be directional microphones (e.g. cardioid microphones) so that focus on a direct is emphasized or an omni-directional microphone. Microphone 110 can be one or more microphones or microphone arrays.

Computing device 200 can include the following: a detection unit 210; a control unit 240, which can be configured to include a controller 242, a processing unit 244 and/or a non-transitory memory 246; a power source 250 (e.g., battery or AC-DC converter); an interface unit 260, which can be configured as an interface for external power connection and/or external data connection such as with microphone 110; a transceiver unit 270 for wireless communication; and antenna(s) 272. The components of computing device 200 can be implemented in a distributed manner.

Detection unit 210 performs the multi-tone siren detection in example embodiments discussed below.

Figure 5:
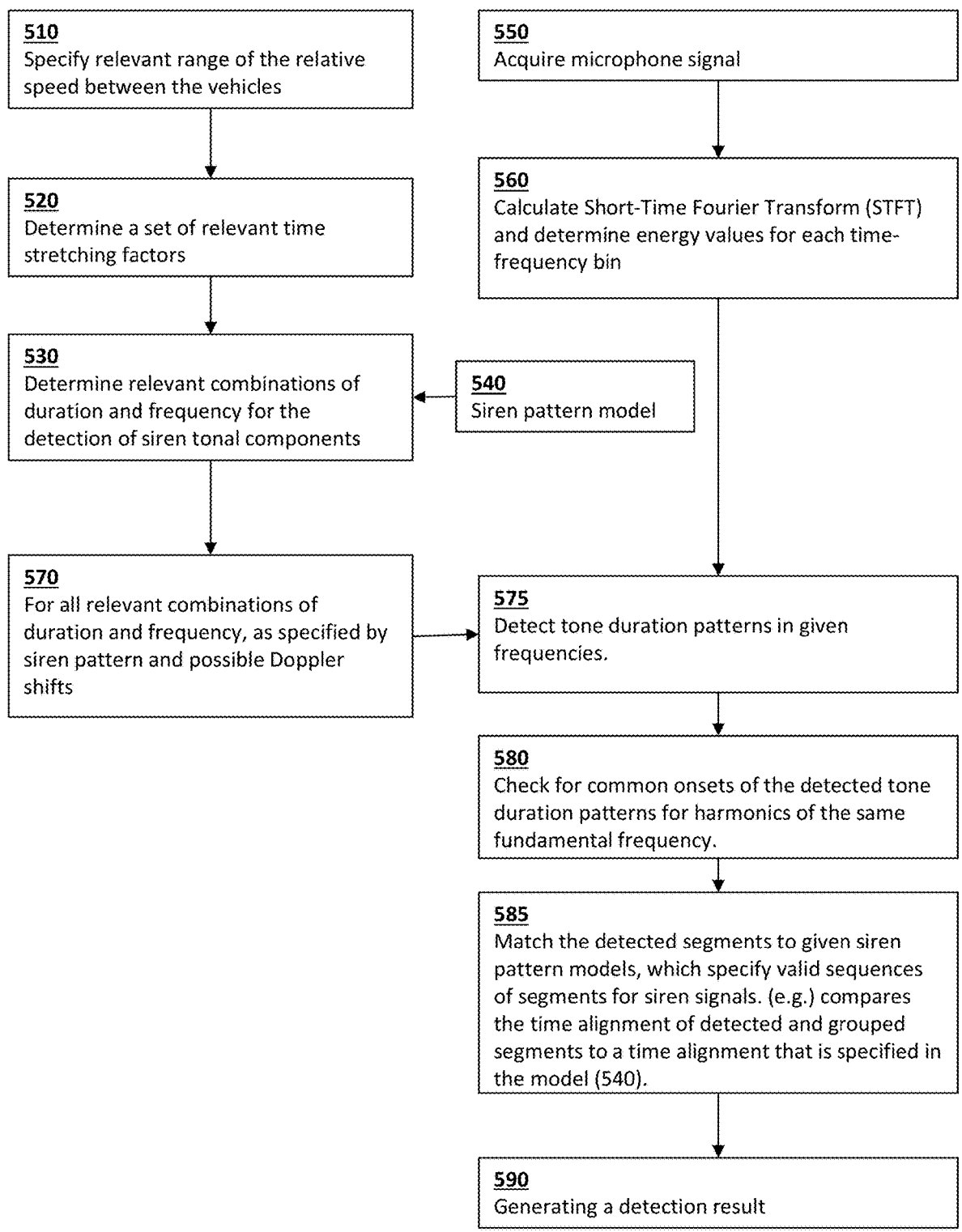
FIG. 5 is a logic diagram of an example method of the present disclosure.

FIG. 5 shows exemplary logic 500 for detection unit 210. Because the Doppler shift, and hence the time stretching factor $\alpha$, are not known in advance, the detection of duration and frequency translated siren patterns for a set of relevant doppler shift are considered. Logic 500 determines a stretching factor $\alpha$ and applies a siren pattern model for the siren pattern. Based on the time stretching factor $\alpha$, the duration is multiplied by $\alpha$ while the frequency is multiplied by $1/\alpha$.

At step 510 a relevant range of the relative speed between vehicles is specified, e.g. a set of speeds such as {137 km/h, 65 km/h, 0 km/h, −59 km/h, −112 km/h} is considered, possibly with a higher resolution.

At step 520, the doppler effect is considered by determining a set or relevant time stretching factors, e.g. {0.9, 0.95, 1.0, 1.05, 1.1}, which has been derived from the above set of relevant relative speeds according to is $tsf(\Delta v)$, as specified before.

At step 530, relevant combinations of duration and frequency for the detection of siren tonal components are determined and siren pattern model 540 is applied. As used here, "relevant combinations" means that durations specified in the siren pattern model are translated through multiplication by all applicable time stretching factors $tsf(\Delta v)$. Frequencies specified in the siren pattern model are translated through multiplication by $1/tsf(\Delta v)$ for all applicable time stretching factors $tsf(\Delta v)$.

Advantageously, using an explicit model 540 yields a robust result. For example, an explicit model allows for a distant siren signal to be detected in loud driving noise. An explicit model allows for better discrimination of the siren signal from local signals in the car, such as media playback from smart phones and tablets or cell phone ring tones.

At step 550, microphone 110 acquires a signal from siren 42.

It is noted that step 550 can occur prior to step 510. Steps 510, 520, and 530 can be performed independent of steps 550 and 560. Likewise, steps 550 and 560 can be performed independent of steps 510, 520, and 530.

At step 560, a time-frequency representation of the microphone input signal is obtained by applying, in real time, a time frequency analysis. In this example, short-Time Fourier Transform (STFT) calculations are performed and energy values for each time-frequency bin are determined by detection unit 210.

At step 570, for all relevant combinations of duration and frequency, as determined in step 530, the following steps are iteratively performed: steps 575, 580, 585 and 595.

At step 575, detection unit 210 detects tone duration patterns for each given frequency At step 580, detection unit 210 checks for common onsets of the detected tone duration patterns for harmonics of the same fundamental frequency to generate detected segments.

At step 585, detection unit 210 matches the detected segments to given siren pattern models, which specify valid sequences of segments for siren signals.

Finally, at step 590, detection unit 210 generates a detection result.

The detection result can be used as input in automated safety systems of automated vehicle 10.

FIG. 6 is an example of a typical tone duration pattern, as used in step 575. The duration pattern specifies the tone activity in time direction. For this example, the duration pattern can be mathematically described by the following equation:

$$P_1(t) = \begin{cases} -1, & 0.0s \leq t < 0.7s \\ +1, & 0.7s \leq t < 1.4s \\ -1, & 1.4s \leq t < 2.1s \\ 0, & \text{otherwise} \end{cases}$$

where a "+1" refers to tone presence, a "−1" refers to tone absence (e.g. because the siren switched to a different frequency) and a "0" refers to areas that are ignored. In the above example, it is assumed that a siren tone of fundamental frequency $\omega_1$ is active for a duration of 0.7 seconds, followed by a leading and trailing tone absence of 0.7 seconds.

FIG. 7 is another example of typical tone duration pattern, as used in step 575, but for detection of an alternating tone pattern that cycles through 2 different frequencies. In this example, a second tone duration pattern that is shifted by one tone length (i.e. 0.7 seconds) is specified. Thus, for this example, the duration pattern can be mathematically described by the following equation:

$$P_2(t) = \begin{cases} -1, & 0.7s \leq t < 1.4s \\ +1, & 1.4s \leq t < 2.1s \\ -1, & 2.1s \leq t < 2.8s \\ 0, & \text{otherwise} \end{cases}$$

This creates an alternating duration pattern for the second siren tone with fundamental frequency $\omega_2$. In this example, the multi-tone model consists of the two tone-duration patterns.

An example algorithm 800 performed by detection unit 210 for detecting tone duration patterns based on integral signal representations as in step 575 is summarized in FIG. 8.

At step 810, detection unit 210 acquires an integral signal representation in time direction over spectral magnitude values or other values that are calculated based on the spectrogram.

At step 820, for each frequency/duration pattern and for each time stretching factor corresponding to a relevant Doppler shift, detection unit 210 calculates the cross-correlation of the tone duration pattern using the integral image representation.

At step 830, detection unit 210 determines presence of duration pattern by post-processing the result of the cross-correlation.

As explained above, the doppler shifted frequencies $\omega_i^{(\alpha)}$ and duration patterns $P_i^{(\alpha)}$ of these patterns need to be considered for all relevant time stretching factors $\alpha$. This is achieved by translating the frequencies $\omega_i$ and patterns $P_i$ as follows:

$$\omega_i^{(\alpha)} = \frac{\omega_i}{\alpha} \text{ and } P_i^{(\alpha)}(t) = P_i\left(\frac{t}{\alpha}\right).$$

Let $X(t, \omega)$ denote the short-time Fourier transform (STFT) of the microphone input signal $x(t)$, where t denotes time and $\omega$ denotes frequency. Furthermore, let $\tilde{X}(t, \omega)$ denote the magnitude spectrogram $\tilde{X}(t, \omega)=|X(t,\omega)|$. Then a straight-forward detection $\delta(t, \omega_i, P_i)$ of a time duration pattern $P_i$ at frequency $\omega_i$ can be achieved by first cross-correlating $P_i(t)$ with $\tilde{X}(t, \omega_i)$, t=0 , . . . , ∞ through convolution with $P_i(-t)$, i.e.

$$\tilde{X}(t, \omega_i) * P_i(-t) = \int_0^\infty \tilde{X}(\tau, \omega_i) \cdot P_i(\tau-t) d\tau,$$

and then applying a threshold $\Gamma$ on the result:

$$\delta(t, \omega_i, P_i) = \begin{cases} 1, & \tilde{X}(t, \omega_i) * P_i(-t) > \Gamma \\ 0, & \text{otherwise} \end{cases}$$

The above cross-correlations become prohibitively expensive if they need to be performed for all possible tone frequencies and duration patterns in all Doppler shifted variants. Advantageously an integral signal representation can be used to efficiently detect the duration patterns $P_i$. For this, the integral signal representation $\overline{X}(t)$ of a signal $X(t)$ is defined as:

$$\overline{X}(t) = \int_0^t X(\tau) d\tau$$

In one example implementation, the integral signal representation can be calculated over the magnitude spectrogram $\tilde{X}(t, \omega_i)$, in direction of t:

$$\overline{X}(t, \omega) = \int \tilde{X}(\tau, \omega) d\tau$$

With this representation, the cross-correlation of $\tilde{X}(t, \omega_i)$ and $P_i(t)$ is easily obtained, as the $P_i$ always consist of segments that assume a value $\alpha_k = -1$ or $\alpha_k = +1$ on a corresponding time interval $t_{k,start} \leq t < t_{k,stop}$:

$$\int_0^\infty \tilde{X}(\tau, \omega_i) \cdot P_i(\tau - t) d\tau = \sum_{k=1}^K a_k \cdot (\overline{X}(t + t_{k,stop}, \omega_i) - \overline{X}(t + t_{k,start}, \omega_i))$$

The calculation includes one multiplication and one subtraction for each segment in the duration pattern. The value K denotes the number of segments, i.e. K=3 in the example $P_1(t)$ from above, for which the cross-correlation with $\tilde{X}(t, \omega_1)$ is calculated as:

$$\int_0^\infty \tilde{X}(\tau, \omega_1) \cdot P_1(\tau - t) d\tau = \begin{array}{l} -(\overline{X}(t+0.7, \omega_1) - \overline{X}(t+0.0, \omega_1)) \\ +(\overline{X}(t+1.4, \omega_1) - \overline{X}(t+0.7, \omega_1)) \\ -(\overline{X}(t+2.1, \omega_1) - \overline{X}(t+1.4, \omega_1)) \end{array}$$

The actual detection of the duration pattern $P_i$ at frequency $\omega_i$ and time t is eventually determined according to $\delta(t, \omega_i, P_i)$.

In another example implementation, the integral signal representation can be calculated over a local signal detector $\Lambda(t, \omega)$:

$$\overline{X}(t, \omega) = \int_0^t \Lambda(\tau, \omega) d\tau$$

A simple local signal detector $\Lambda(t, \omega)$ can detect signal presence, i.e. assume a value of one, if the spectral magnitude value $\tilde{X}(t, \omega)$ exceeds a specified SNR threshold $\Gamma_{SNR}$ whereas it can be zero otherwise:

$$\Lambda(t, \omega) = \begin{cases} 1, & \tilde{X}(t, \omega) / \tilde{N}(t, \omega) > \Gamma_{SNR} \\ 0, & \text{otherwise} \end{cases}$$

where $\tilde{N}(t, \omega)$ denotes a noise spectral magnitude estimate at time t and frequency $\omega$.

It is envisioned that a more sophisticated local signal detector can use a tone, peak or harmonics detector based on more complex functions of spectral magnitude values.

It should be apparent that integral signal representations can also be two sided, i.e. the integral signal representation may be calculated as a two-sided integral if this is suitable:

$$\overline{X}(t) = \int_{-t}^{t} X(\tau) d\tau$$

It should be apparent that the integral signal representations are calculated in time direction and can be calculated for individual frequency bins of the spectrogram, power ratios of values in the spectrogram or more general functions of the spectrogram, such as a local tone detection measure.

It should be understood that elements or functions of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

While the present disclosure has been described with reference to one or more exemplary embodiments, it will be understood by those skilled in the art, that various changes can be made, and equivalents can be substituted for elements thereof without departing from the scope of the present disclosure. In addition, many modifications can be made to adapt a particular situation or material to the teachings of the present disclosure without departing from the scope thereof. Therefore, it is intended that the present disclosure will not be limited to the particular embodiments disclosed herein, but that the disclosure will include all aspects falling within the scope of a fair reading of appended claims.

The inventioned claimed is:

1. A computer-implemented method comprising:
   obtaining, by a computing device, a microphone input signal;
   applying in real time, by the computing device, a time-frequency analysis in order to obtain a time-frequency representation of the microphone input signal;
   providing, by the computing device, at least one multi-tone model that has a plurality of tone duration patterns; performing, by the computing device, multi-tone siren detection on the time-frequency representation of the signal, wherein the multi-tone detection is based on the at least one multi-tone model and factoring of doppler shifts; and
   generating, by the computing device, a detection result;
   wherein performing the multi-siren detection further comprises grouping tone duration patterns which have common onsets and the same fundamental frequency.

2. The method of claim 1, wherein the performing of the multi-siren detection further comprises:
   siren pattern matching by a temporal alignment of tone duration patterns for at least two different multi-tone models.

3. The method of claim 1, wherein the multi-siren detection is performed for a set of different time stretching factors for each tone duration pattern.

4. The method of claim 1, wherein the multi-tone siren detection is performed by an integral signal representation.

5. The method of claim 4, wherein the integral signal representation is two-sided.

6. A computer program product residing on a non-transitory computer readable storage medium having a plurality of instructions stored thereon which, when executed across one or more processors, causes at least a portion of the one or more processors to perform operations comprising:
   obtaining a microphone input signal;
   applying in real time a time-frequency analysis in order to obtain a time-frequency representation of the microphone input signal;
   providing at least one multi-tone model that has a plurality of tone duration patterns;
   performing multi-tone siren detection on the time-frequency representation of the signal, wherein the multi-tone detection is based on the at least one multitone model and factoring of doppler shifts; and
   generating a detection result;
   wherein performing the multi-siren detection further comprises grouping tone duration patterns which have common onsets and the same fundamental frequency.

7. The computer program product of claim 6, wherein the performing multi-siren detection further comprises:
   siren pattern matching by a temporal alignment of tone duration patterns for at least two different multi-tone models.

8. The computer program product of claim 6, wherein the multi-siren detection is performed for a set of different time stretching factors for each tone duration pattern.

9. The computer program product of claim 6, wherein the multi-tone siren detection is performed by an integral signal representation.

10. The computer program product of claim 9, wherein the integral signal representation is two-sided.

11. A computing system including one or more processors and one or more non-transitory memories storing program instructions that, when executed, perform operations comprising:
   obtaining a microphone input signal;
   applying in real time a time-frequency analysis in order to obtain a time-frequency representation of the microphone input signal;
   providing at least one multi-tone model that has a plurality of tone duration patterns;
   performing multi-tone siren detection on the time-frequency representation of the signal, wherein the multitone detection is based on the at least one multitone model and factoring of doppler shifts; and generating a detection result;

wherein performing the multi-siren detection further comprises grouping tone duration patterns which have common onsets and the same fundamental frequency.

12. The computing system of claim 11, wherein the performing of the multi-siren detection further comprises:

siren pattern matching by a temporal alignment of tone duration patterns for at least two different multi-tone models.

13. The computing system of claim 11, wherein the multi-siren detection is performed for a set of different time stretching factors for each tone duration pattern.

14. The computing system of claim 11, wherein the multi-tone siren detection is performed by an integral signal representation.

15. The computing system of claim 14, wherein the integral signal representation is two-sided.

* * * * *